(12) United States Patent
Liu et al.

(10) Patent No.: US 11,733,576 B2
(45) Date of Patent: Aug. 22, 2023

(54) ARRAY SUBSTRATE AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Xiaona Liu, Beijing (CN); Weitao Chen, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/514,668

(22) Filed: Oct. 29, 2021

(65) Prior Publication Data

US 2022/0299810 A1  Sep. 22, 2022

(30) Foreign Application Priority Data

Mar. 16, 2021 (CN) .......................... 202110281696.X

(51) Int. Cl.
*G02F 1/1368* (2006.01)
*G02F 1/1343* (2006.01)
*G02F 1/1362* (2006.01)

(52) U.S. Cl.
CPC ...... *G02F 1/1368* (2013.01); *G02F 1/134318* (2021.01); *G02F 1/136227* (2013.01); *G02F 1/136286* (2013.01)

(58) Field of Classification Search
CPC ..................................................... G02F 1/1368
See application file for complete search history.

(56) References Cited

U.S. PATENT DOCUMENTS

| | | | |
|---|---|---|---|
| 2013/0126876 A1* | 5/2013 | Shin | H01L 27/1248 257/59 |
| 2016/0342034 A1* | 11/2016 | Wu | H01L 29/78633 |
| 2017/0059953 A1* | 3/2017 | Huang | G02F 1/1368 |
| 2018/0095334 A1* | 4/2018 | Zang | G02F 1/136286 |
| 2018/0095336 A1* | 4/2018 | Fukutome | G09G 3/3677 |
| 2018/0341158 A1* | 11/2018 | Wang | H01L 21/77 |
| 2019/0172882 A1* | 6/2019 | Nam | G06F 3/0412 |
| 2020/0411679 A1* | 12/2020 | Ogawa | H01L 29/66462 |

* cited by examiner

*Primary Examiner* — Sang V Nguyen
(74) *Attorney, Agent, or Firm* — Myers Bigel, P.A.

(57) ABSTRACT

Embodiments of the present application provide an array substrate and a display device. The array substrate includes a plurality of sub-pixel units arranged in an array, each sub-pixel unit includes a base substrate, a thin film transistor, a pixel electrode and a common electrode, the common electrode is on a side of the base substrate, the thin film transistor and the pixel electrode are between the base substrate and the common electrode, the thin film transistor includes a control terminal, a first electrode and a second electrode, the pixel electrode is connected to the second electrode, and the control terminal is in a continuous sheet shape, an orthographic projection of a boundary of the control terminal on the base substrate is within an orthographic projection of the common electrode on the base substrate.

16 Claims, 11 Drawing Sheets

ARRAY SUBSTRATE AND DISPLAY DEVICE

RELATED APPLICATION

The present application claims the benefit of Chinese Patent Application No. 202110281696X, filed on Mar. 16, 2021, the entire disclosure of which is incorporated herein by reference.

TECHNICAL FIELD

The present disclosure relates to the field of display technology, in particular to an array substrate and a display device.

BACKGROUND

With the advancement of technology, liquid crystal displays are widely used in electronic products such as TVs, computers, and mobile phones due to their small size, thin thickness, light weight and low power consumption. Liquid crystal displays cannot self-illuminate and require additional backlighting. In the dark state, the liquid crystals at certain positions are deflected due to the influence of the irregular electric field, so that the backlight passes through the deflected liquid crystals to be received by the human eyes, which causes the brightness of the dark state to increase and affects the viewing effect.

SUMMARY

As a first aspect of the embodiments of the present disclosure, an embodiment of the present disclosure provides an array substrate comprising a plurality of sub-pixel units arranged in an array, each sub-pixel unit comprising a base substrate, a thin film transistor, a pixel electrode and a common electrode, the common electrode being on a side of the base substrate, the thin film transistor and the pixel electrode being between the base substrate and the common electrode, the thin film transistor comprising a control terminal, a first electrode and a second electrode, the pixel electrode being connected to the second electrode, and the control terminal being in a continuous sheet shape, an orthographic projection of a boundary of the control terminal on the base substrate being within an orthographic projection of the common electrode on the base substrate.

In some implementations, an orthographic projection of the control terminal on the base substrate and the orthographic projection of the common electrode on the base substrate have a first overlap area, and the first overlap area extends from the boundary of the control terminal toward a middle part of the control terminal.

In some implementations, a part of the orthographic projection of the control terminal on the base substrate is in the first overlap area, and a range of a width d of the first overlap area satisfies 0<d<s/2, s is a width of the control terminal, and measurement directions of d and s are same.

In some implementations, the orthographic projection of the control terminal on the base substrate is completely in the first overlap area, and a width of the first overlap area is equal to a width of the control terminal.

In some implementations, the thin film transistor further comprises an active layer, the array substrate further comprises a first insulating layer, the control terminal is on a side of the base substrate, the first insulating layer is on a side of the control terminal away from the base substrate, the active layer is on a side of the first insulating layer away from the base substrate, and the first electrode and the second electrode are on a side of the active layer away from the base substrate, an orthographic projection of the first electrode on the base substrate is within an orthographic projection of the control terminal on the base substrate.

In some implementations, the array substrate further comprises a second insulating layer, the second insulating layer is on a side of the second electrode away from the base substrate, the common electrode is on a side of the second insulating layer away from the base substrate, and the pixel electrode is between the active layer and the second electrode.

In some implementations, the array substrate further comprises a second insulating layer, the second insulating layer is on a side of the second electrode away from the base substrate, the common electrode is on a side of the second insulating layer away from the base substrate, and the pixel electrode is between the second electrode and the second insulating layer.

In some implementations, the thin film transistor further comprises an active layer, the active layer is on a side of the base substrate, the array substrate further comprises a first insulating layer, a second insulating layer and a third insulating layer, the first insulating layer is on a side of the active layer away from the base substrate, the control terminal is on a side of the first insulating layer away from the base substrate, the second insulating layer is on a side of the control terminal away from the base substrate, the third insulating layer is on a side of the second insulating layer away from the base substrate, the first electrode, the second electrode, and the pixel electrode are between the second insulating layer and the third insulating layer, and the common electrode is on a side of the third insulating layer away from the base substrate.

In some implementations, an orthographic projection of the first electrode on the base substrate and the orthographic projection of the common electrode on the base substrate have a second overlap area, and the second overlap area extends from an outer boundary of the first electrode toward a middle part of the control terminal.

In some implementations, the common electrode comprises a plurality of first strip-shaped sub-electrodes arranged at intervals in the sub-pixel unit.

In some implementations, the array substrate further comprises a plurality of gate lines and a plurality of data lines, the plurality of gate lines and the plurality of data lines define the plurality of sub-pixel units, and an extending direction of the first strip-shaped sub-electrodes is consistent with an extending direction of the data lines.

In some implementations, the common electrode further comprises second strip-shaped sub-electrodes, an extending direction of the second strip-shaped sub-electrodes is consistent with the extending direction of the data lines, and an orthographic projection of the data lines on the base substrate is within an orthographic projection of the second strip-shaped sub-electrodes on the base substrate.

In some implementations, the common electrode further comprises a connecting portion, and each of the first strip-shaped sub-electrodes and each of the second strip-shaped sub-electrodes are connected to each other through the connecting portion.

As a second aspect of the embodiments of the present disclosure, an embodiment of the present disclosure provides a display device, which comprises a first substrate and a second substrate disposed oppositely, and a liquid crystal layer between the first substrate and the second substrate, the first substrate adopting the array substrate in any embodiment of the present disclosure, the common electrode facing the liquid crystal layer.

In some implementations, an orthographic projection of the control terminal on the base substrate and the orthographic projection of the common electrode on the base substrate have a first overlap area, and the first overlap area extends from the boundary of the control terminal toward a middle part of the control terminal.

In some implementations, a part of the orthographic projection of the control terminal on the base substrate is in the first overlap area, and a range of a width d of the first overlap area satisfies 0<d<s/2, s is a width of the control terminal, and measurement directions of d and s are same.

In some implementations, the orthographic projection of the control terminal on the base substrate is completely in the first overlap area, and a width of the first overlap area is equal to a width of the control terminal.

In some implementations, an orthographic projection of the first electrode on the base substrate and the orthographic projection of the common electrode on the base substrate have a second overlap area, and the second overlap area extends from an outer boundary of the first electrode toward a middle part of the control terminal.

In some implementations, the thin film transistor further comprises an active layer, the array substrate further comprises a first insulating layer, the control terminal is on a side of the base substrate, the first insulating layer is on a side of the control terminal away from the base substrate, the active layer is on a side of the first insulating layer away from the base substrate, and the first electrode and the second electrode are on a side of the active layer away from the base substrate, an orthographic projection of the first electrode on the base substrate is within an orthographic projection of the control terminal on the base substrate.

In some implementations, the thin film transistor further comprises an active layer, the active layer is on a side of the base substrate, the array substrate further comprises a first insulating layer, a second insulating layer and a third insulating layer, the first insulating layer is on a side of the active layer away from the base substrate, the control terminal is on a side of the first insulating layer away from the base substrate, the second insulating layer is on a side of the control terminal away from the base substrate, the third insulating layer is on a side of the second insulating layer away from the base substrate, the first electrode, the second electrode, and the pixel electrode are between the second insulating layer and the third insulating layer, and the common electrode is on a side of the third insulating layer away from the base substrate.

The above summary is only for illustrative purposes and is not intended to be limiting in any way. In addition to the exemplary aspects, embodiments and features described above, by referring to the accompanying drawings and the following detailed description, further aspects, embodiments and features of the present disclosure will be easy to appreciate.

BRIEF DESCRIPTION OF THE DRAWINGS

In the drawings, unless otherwise specified, the same reference numerals denote the same or similar portions or elements throughout the multiple drawings. The drawings are not necessarily drawn to scale. It should be understood that these drawings only depict some embodiments according to the present disclosure, and should not be regarded as limiting the scope of the present disclosure.

FIG. 2b shows the common electrode in FIG. 2a;

FIG. 2c shows the common electrode and the control terminal in FIG. 2a;

FIG. 2d shows the common electrode and the first electrode in FIG. 2a;

FIG. 6b is a schematic diagram of the A-A cross-sectional structure in FIG. 6a;

FIG. 7b is a schematic diagram of the A-A cross-sectional structure in FIG. 7a;

FIG. 8b is a schematic diagram of the A-A cross-sectional structure in FIG. 8a;

FIG. 9b is a schematic diagram of the A-A cross-sectional structure in FIG. 9a.

DETAILED DESCRIPTION OF THE DISCLOSURE

Only some exemplary embodiments are briefly described below. As those skilled in the art can realize, the described embodiments may be modified in various different ways without departing from the spirit or scope of the present disclosure. Therefore, the drawings and description are regarded to be illustrative essentially but not restrictive.

Figure 1:
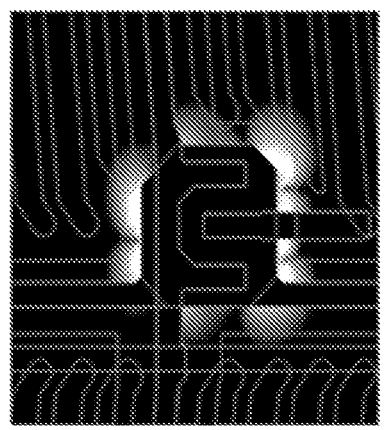
FIG. 1 is a schematic diagram of light leakage of a liquid crystal display device in a dark state in the related art.

FIG. 1 is a schematic diagram of light leakage of a liquid crystal display device in a dark state in the related art. It can be seen from FIG. 1 that in the dark state, the display device has light leakage, which causes the brightness of the dark state to increase, which affects the viewing effect.

There are a variety of metal traces in a substrate such as an array substrate. The relative positions of the metal traces make the distribution of electric field in the array substrate disorder and cannot be effectively controlled, resulting in liquid crystal deflection in partial areas which leads to light leakage. In the related art, the technical solution to avoid light leakage is to use a black matrix for shielding. However, the black matrix can only block light leakage at a positive viewing angle. To ensure that the black matrix can block light leakage at an oblique viewing angle, the size of the black matrix needs to be increased, which will reduce the aperture ratio of the display device.

In addition, the liquid crystal material in the display device is anisotropic. The anisotropic liquid crystal material has light transmission properties. A small amount of light in the light leakage area will be transmitted to the pixel area. Although there is no obvious light leakage visually, it affects the contrast of the product.

For a liquid crystal display device in fringe field switching (FFS) mode, in the dark state, the voltages of the pixel electrode and the common electrode are both 0 V, and the voltage of the source electrode is within the range of $0 \sim \pm V_{op}$, and the voltage of the gate electrode is usually $-8V$ or $18V$. Therefore, in the dark state, there is a voltage difference between the gate electrode and the pixel electrode or the common electrode to generate an electric field, and there is a voltage difference between the source electrode and the pixel electrode or the common electrode to generate an electric field. These electric fields will cause the liquid crystals in the corresponding positions to deflect, leading to light leakage. Although a black matrix is used for light leakage shielding, when the size of the black matrix is certain, the black matrix cannot shield the light leakage from the oblique viewing angle, which causes the display device to have high brightness in the dark state, resulting in lower contrast. In addition, the alignment of the black matrix and the array substrate will have a deviation, which is greatly affected by the process stability, resulting in large fluctuations in the brightness in the dark state, and the macroscopic performance is large fluctuations in contrast, which is difficult to meet the customer's requirements for contrast.

In order to solve the problem of light leakage in the display device, an embodiment of the present disclosure provides an array substrate.

Figure 2A:
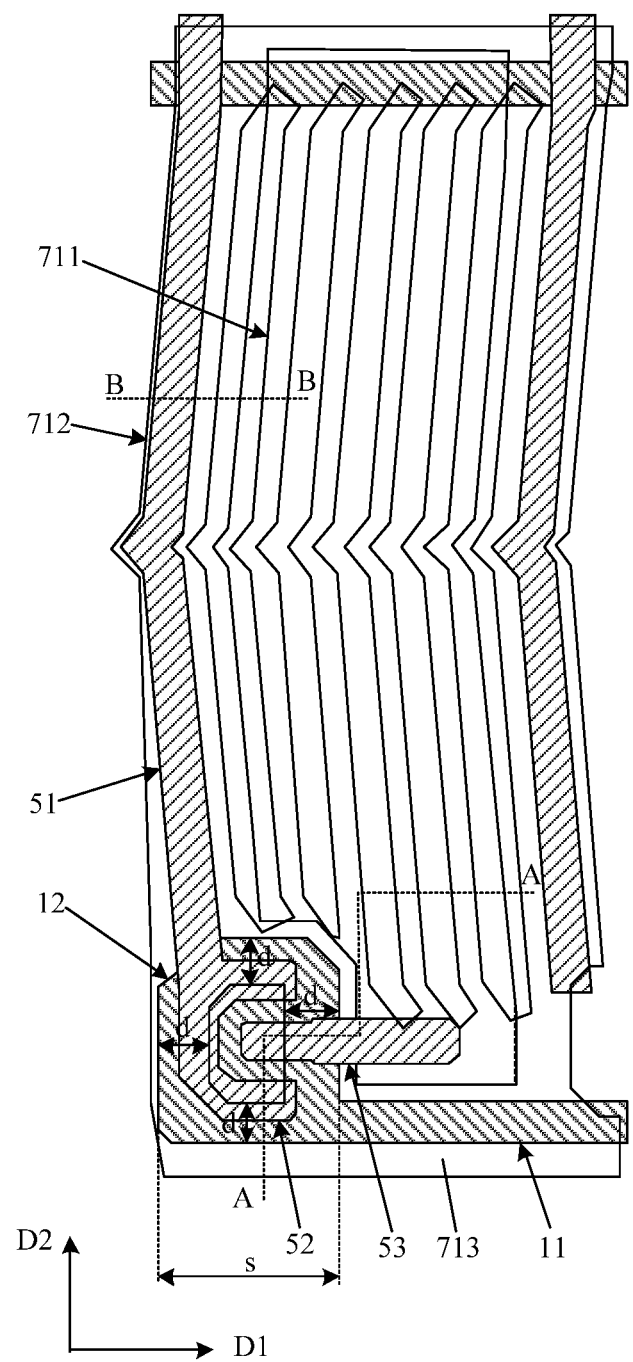
FIG. 2a is a schematic plan view of an array substrate in an embodiment of the disclosure.
Figure 3:
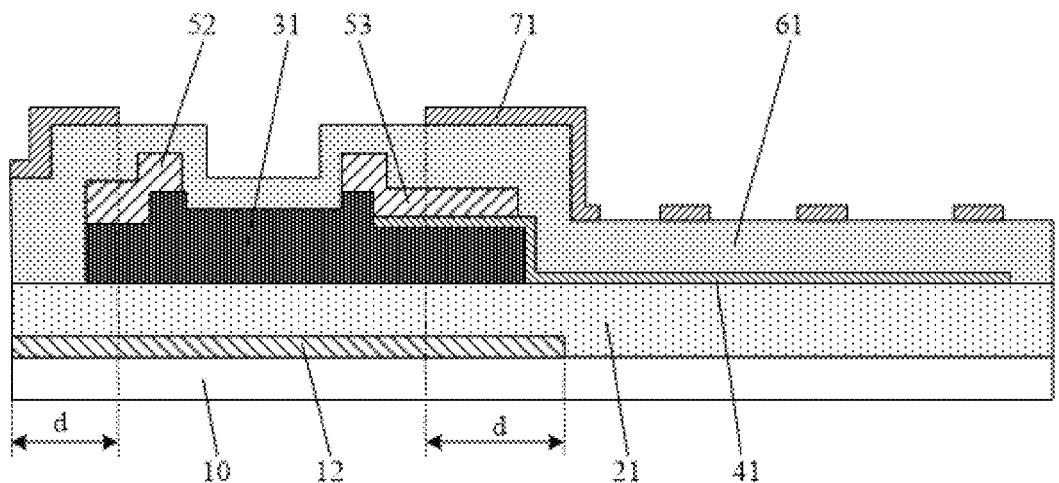
FIG. 3 is a schematic diagram of the A-A cross-sectional structure in FIG. 2.

FIG. 2a is a schematic plan view of the array substrate in an embodiment of the present disclosure. FIG. 3 is a schematic diagram of the A-A cross-sectional structure in FIG. 2a. FIG. 2a shows a sub-pixel unit in the array substrate, in which the active layer 31 is not shown for clarity. As shown in FIG. 2a and FIG. 3, the array substrate may include a plurality of gate lines 11 and a plurality of data lines 51, and the plurality of gate lines 11 and the plurality of data lines 51 define a plurality of sub-pixel units arranged in an array. Each sub-pixel unit may include a base substrate 10, a thin film transistor, a pixel electrode 41 and a common electrode 71. The common electrode 71 is on a side of the base substrate 10, and the thin film transistor and the pixel electrode 41 are between the base substrate 10 and the common electrode 71. The thin film transistor includes a control terminal 12, an active layer 31, a first electrode 52 and a second electrode 53. The pixel electrode 41 is connected to the second electrode 53 of the thin film transistor. The control terminal 12 of the thin film transistor is in a continuous sheet shape, and an orthographic projection of a boundary of the control terminal 12 of the thin film transistor on the base substrate 10 being within an orthographic projection of the common electrode 71 on the base substrate 10.

Exemplarily, the control terminal may be a gate electrode, one of the first electrode 52 and the second electrode 53 may be a source electrode, and the other may be a drain electrode. For example, the first electrode 52 may be a source electrode, and the second electrode 53 may be a drain electrode.

In the array substrate of the embodiment of the present disclosure, the thin film transistor and the pixel electrode 41 are between the base substrate 10 and the common electrode 71, the control terminal 12 of the thin film transistor is in a continuous sheet shape, and the orthographic projection of the boundary of the control terminal 12 of the thin film transistor on the base substrate 10 is within the orthographic projection of the common electrode 71 on the base substrate 10. Thus, the orthographic projection of the control terminal 12 of the thin film transistor on the base substrate 10 and the orthographic projection of the common electrode 71 on the base substrate 10 have a first overlap area 110. The portion of the common electrode 71 corresponding to the first overlap area 110 is in a continuous sheet shape. Therefore, the common electrode 71 can completely shield the electric field in the first overlap area 110.

It can be understood that in the dark state, the voltages of the pixel electrode and the common electrode are both 0V, and the voltage of the gate electrode is usually $-8V$ or $18V$. In the array substrate according to the embodiment of the present disclosure, the orthographic projection of the boundary of the control terminal 12 of the thin film transistor on the base substrate 10 is within the orthographic projection of the common electrode 71 on the base substrate 10. Therefore, in the dark state (L0 state), the electric field generated by the boundary of the control terminal 12 and the pixel electrode 41, and the electric field generated by the boundary of the control terminal 12 and the common electrode 71 can both be shielded by the common electrode 71 with a common voltage to avoid the electric field enters the liquid crystal layer to cause the liquid crystal to deflect. Therefore, the light leakage resulted from the liquid crystal deflection caused by the irregular electric field is avoided, the brightness of the display device in the dark state is reduced, and the contrast of the product is improved.

In an embodiment, the first overlap area 110 extends from the boundary of the control terminal 12 toward the middle part of the control terminal 12. It can be understood that the material of the control terminal 12 can be light-shielding metal. The control terminal 12 can prevent light from passing through the middle part of the control terminal 12 due to the light-shielding property, so light leakage usually occurs at the boundary position of the control terminal 12. The first overlap area 110 is set to extend from the boundary of the control terminal 12 toward the middle part of the control terminal 12, the electric field generated by the boundary of the control terminal 12 and the position close to the boundary and the pixel electrode 41, the electric field generated by the boundary of the control terminal 12 and the position close to the boundary and the common electrode 71 can both be shielded by the common electrode 71 with a common voltage to avoid the deflection of the liquid crystal near the boundary of the control terminal 12, thereby avoiding light leakage at the boundary of the control terminal 12.

Figure 2B:
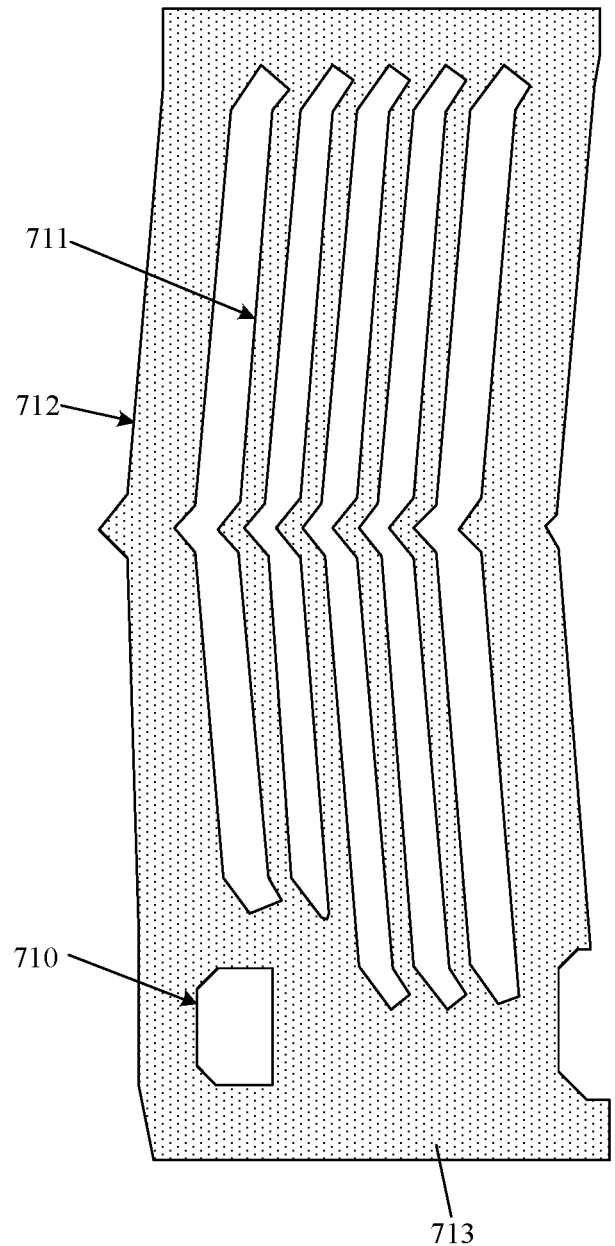
Figure 2C:
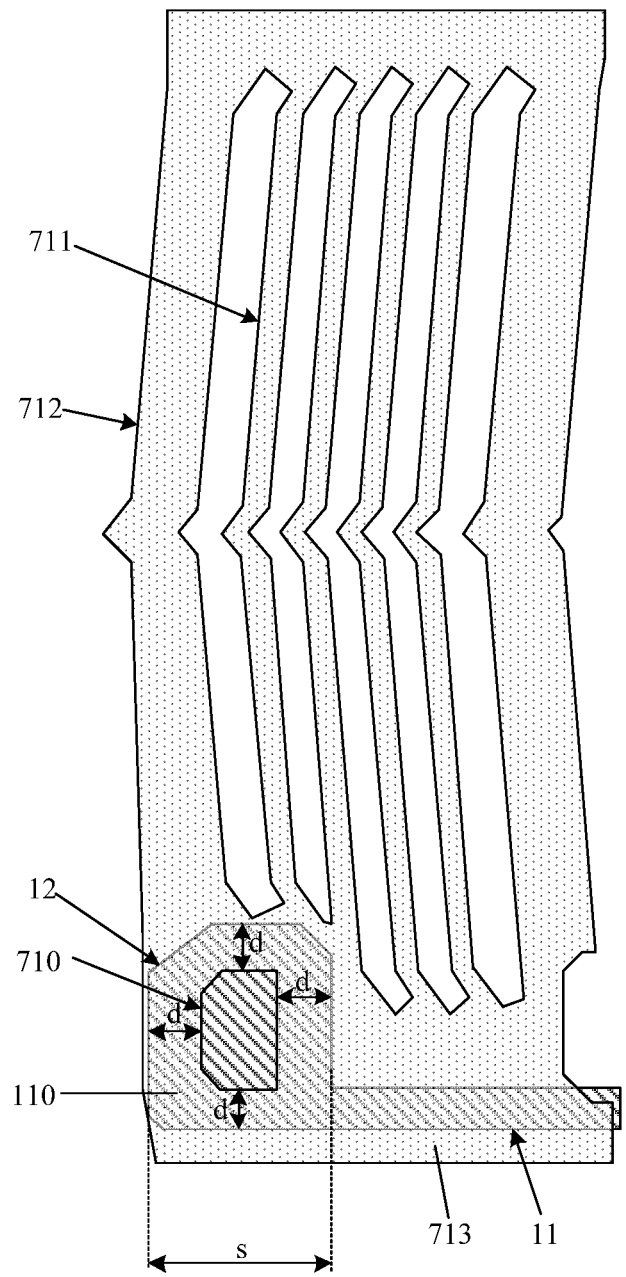

In an embodiment, as shown in FIG. 2a, FIG. 2b and FIG. 2c, the portion of the common electrode 71 corresponding to the control terminal includes an opening 710, and a part of the orthographic projection of the control terminal 12 on the base substrate 10 is in the first overlap area 110, and a range of a width d of the first overlap area 110 satisfies 0<d≤s/2, s is a width of the control terminal, and the measurement directions of d and s are the same. The width of the first overlap area 110 is the size of the first overlap area 110 in the direction perpendicular to the direction in which it extends. For example, as shown in FIG. 2c, for the portion of the first overlap area 110 extending in the vertical direction, the width of the first overlap area 110 is the dimension along the horizontal direction, and for the portion of the first overlap area 110 extending in the horizontal direction, the width of the first overlap area 110 is the dimension along the vertical direction, as indicated by d in FIG. 2c.

In an embodiment, the part of the common electrode corresponding to the control terminal is in a continuous sheet shape, and the orthographic projection of the control terminal on the base substrate is completely covered by the orthographic projection of the common electrode on the base substrate, that is, the orthographic projection of the control terminal on the base substrate is completely in the first overlap area. In this case, the width of the first overlap area is equal to the width of the control terminal.

As shown in FIG. 2a and FIG. 3, the array substrate may further include a first insulating layer 21, and the thin film transistor may also include an active layer 31. The control terminal 12 is on a side of the base substrate 10, the first insulating layer 21 is on a side of the control terminal 12 away from the base substrate 10, and the active layer 31 is on a side of the first insulating layer 21 away from the base substrate 10. The first electrode 52 and the second electrode 53 are on a side of the active layer 31 away from the base substrate 10. In an embodiment, an orthographic projection of the first electrode 52 on the base substrate 10 is within the orthographic projection of the control terminal 12 on the base substrate 10.

It can be understood that, in the liquid crystal display device, the backlight can be arranged on a side of the base substrate 10 away from the thin film transistor, so that the control terminal 12 can block the first electrode 52 from the backlight side. When the liquid crystal is deflected by the electric field generated between the first electrode 52 and the common electrode 41, since the control terminal 12 blocks the light, there will be no light leakage due to the liquid crystal deflection.

Figure 2D:
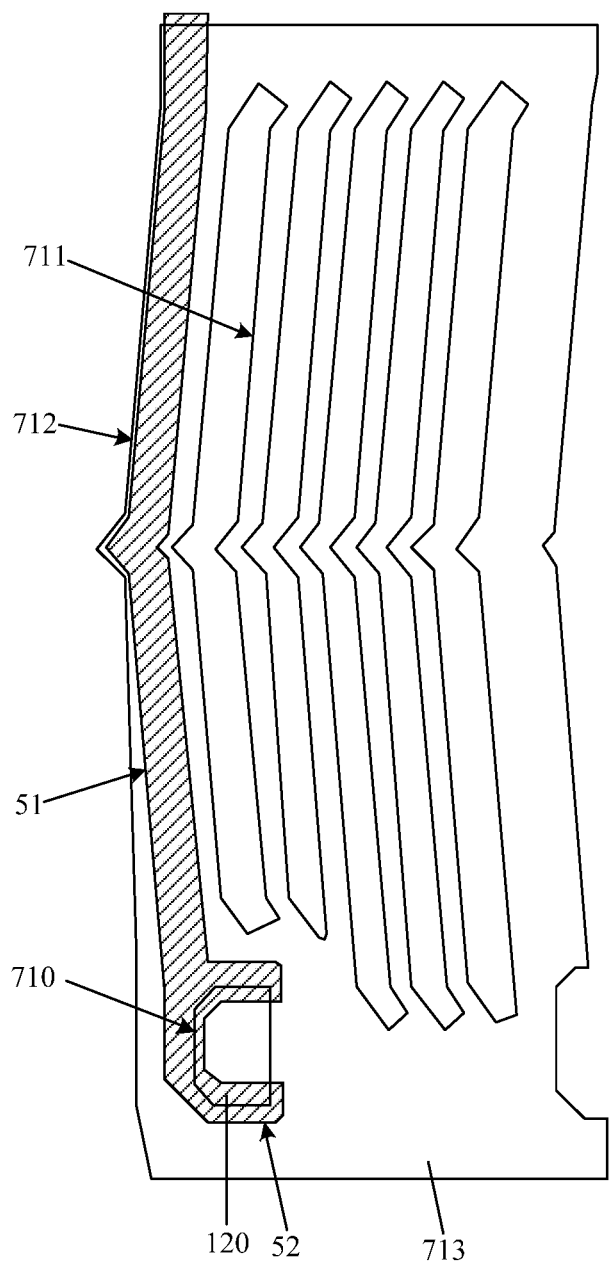

In an embodiment, as shown in FIG. 2d, the orthographic projection of the first electrode 52 on the base substrate 10 and the orthographic projection of the common electrode 71 on the base substrate 10 have a second overlap area 120, and the second overlap area 120 extends from the outer boundary of the first electrode 52 toward the middle part of the control terminal 12. With this arrangement, the common electrode 71 with a common voltage can shield the electric field generated at the outer boundary of the first electrode 52, and prevent the electric field at the outer boundary of the first electrode 52 from causing the liquid crystal to deflect and then leading to leak light.

In the embodiment shown in FIG. 2a and FIG. 2d, the first electrode 52 has a "U"-shaped groove shape, and the second electrode 53 is inserted in the groove of the first electrode 52. It can be understood that the specific shape of the first electrode 52 can be set according to actual needs, and is not limited to the shape in FIG. 2a and FIG. 2d. It should be noted that "the outer boundary of the first electrode" refers to the outer edge of the boundary of the first electrode facing the control terminal in a plane parallel to the base substrate. For example, the outer boundary of the first electrode 52 in FIG. 2a is the edge of the outer contour of the "U"-shaped groove.

In an embodiment, as shown in FIG. 3, the array substrate may further include a second insulating layer 61, the second insulating layer 61 is on a side of the second electrode 53 away from the base substrate 10, and the common electrode 71 is on a side of the second insulating layer 61 away from the base substrate. Exemplarily, the pixel electrode 41 may be between the active layer 31 and the second electrode 53, as shown in FIG. 3. Alternatively, the pixel electrode may be between the second electrode and the second insulating layer, and the pixel electrode is connected to the second electrode.

The thin film transistors shown in FIG. 2a and FIG. 3 are bottom gate thin film transistors, and the technical solutions of the present disclosure are also applicable to top gate thin film transistors.

Figure 4:
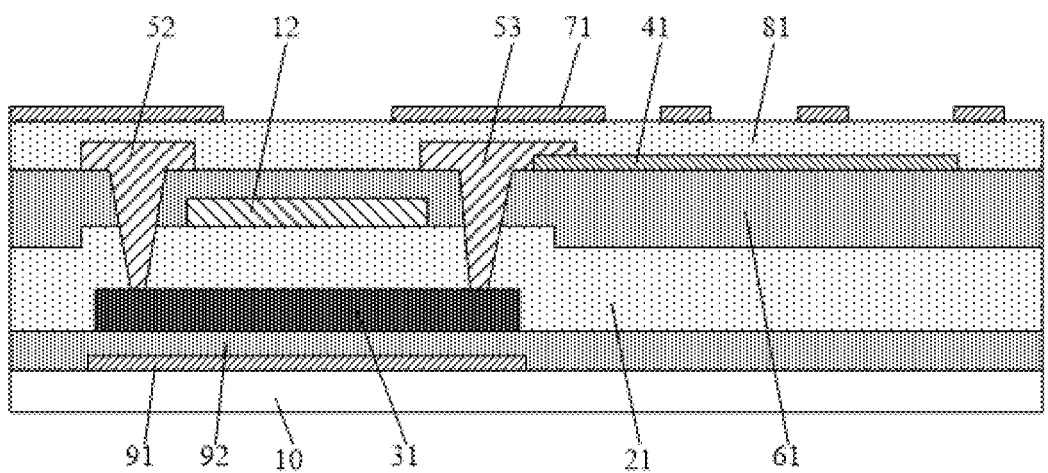
FIG. 4 is a schematic diagram of a cross-sectional structure of an array substrate according to another embodiment of the present disclosure.

FIG. 4 is a schematic diagram of a cross-sectional structure of an array substrate according to another embodiment of the present disclosure. As shown in FIG. 4, the thin film transistor includes a control terminal 12, a first electrode 52, a second electrode 53 and an active layer 31. The array substrate further includes a first insulating layer 21, a second insulating layer 61, and a third insulating layer 81. The active layer 31 is on a side of the base substrate 10, the first insulating layer 21 is on a side of the active layer 31 away from the base substrate 10, the control terminal 12 is on a side of the first insulating layer 21 away from the base substrate 10, the second insulating layer 61 is on a side of the control terminal 12 away from the base substrate 10, and the third insulating layer 81 is on a side of the second insulating layer 61 away from the base substrate 10. The first electrode 52, the second electrode 53 and the pixel electrode 41 are all between the second insulating layer 61 and the third insulating layer 81, and the pixel electrode 41 is connected to the second electrode 53. The first electrode 52 is connected to the active layer 31 through a via hole that penetrates the second insulating layer 61 and the first insulating layer 21, and the second electrode 53 is connected to the active layer 31 through a via hole that penetrates the second insulating layer 61 and the first insulating layer 21. Exemplarily, the pixel electrode 41 is on the side of the second insulating layer 61 away from the base substrate 10, and the first electrode 52 and the second electrode 53 are on the side of the pixel electrode 41 away from the base substrate 10. The common electrode 71 is on the side of the third insulating layer 81 away from the base substrate 10.

It can be understood that in the top gate thin film transistor, the orthographic projection of the outer boundary of the first electrode 52 on the base substrate 10 may be outside the orthographic projection of the active layer 31 on the base substrate, then the active layer 31 can not shield the boundary of the first electrode 52, which causes light leakage at the boundary of the first electrode 52. In an embodiment, as shown in FIG. 2d, the orthographic projection of the first electrode 52 on the base substrate and the orthographic projection of the common electrode 71 on the base substrate have a second overlap area 120, and the second overlap area 120 extends from the outer boundary of the first electrode 52 toward the middle part of the control terminal 12. Therefore, when an electric field is generated between the first electrode 52 and the common electrode, the portion of the common electrode corresponding to the second overlap area 120 can shield the electric field at the boundary of the first electrode 52, and avoid the liquid crystal corresponding to the boundary of the first electrode 52 to deflect, thereby avoiding light leakage caused by liquid crystal deflection.

Exemplarily, as shown in FIG. 4, the array substrate may further include a light-shielding layer 91 and a fourth insulating layer 92. The light-shielding layer 91 is on a side of the base substrate 10 facing the active layer 31, and the fourth insulating layer 92 is on a side of the light-shielding layer 91 away from the base substrate 10, the active layer 31 is on a side of the fourth insulating layer 92 away from the base substrate 10. The orthographic projection of the active layer 31 on the base substrate 10 may be within the orthographic projection of the light shielding layer 91 on the base substrate 10. The light-shielding layer 91 can shield the light from the lower side of the base substrate 10 to avoid affecting the working performance of the thin film transistor. The material of the light-shielding layer 91 may include an opaque metal, such as at least one of tantalum (Ta), molybdenum (Mo), tungsten (W), aluminum (Al), and the like.

The shape of the first electrode 52 shown in FIG. 4 may be the same as or different from the shape of the first electrode 52 in FIG. 2a and FIG. 2d.

Figure 5:
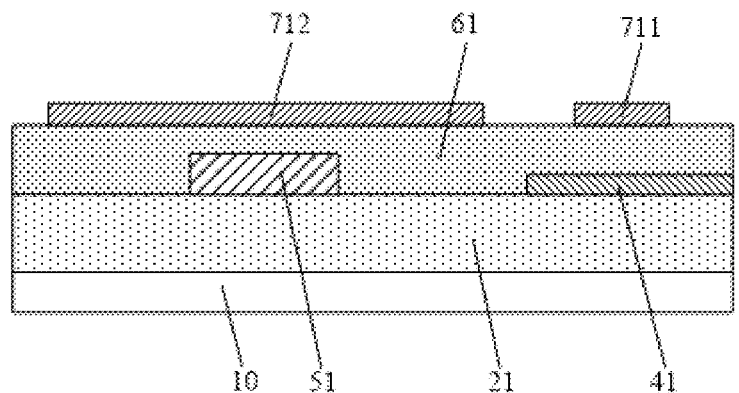
FIG. 5 is a schematic diagram of the B-B cross-sectional structure in FIG. 2.

FIG. 5 is a schematic diagram of the B-B cross-sectional structure in FIG. 2a. In an embodiment, the array substrate may include a plurality of gate lines 11 and a plurality of data lines 51, and the plurality of gate lines 11 and the plurality of data lines 51 define a plurality of sub-pixel units arranged in an array. The gate lines 11 may extend in a first direction D1, and the data lines 51 may extend in a second direction D2, which is perpendicular to the first direction D1. As shown in FIG. 2a, FIG. 3, and FIG. 5, the pixel electrode 41 is in the sub-pixel unit, and the pixel electrode 41 may have a sheet structure. The common electrode 71 may include a plurality of first strip-shaped sub-electrodes 711 arranged at intervals in the sub-pixel unit, and the extending direction of the first strip-shaped sub-electrodes 711 may be consistent with the extending direction of the data lines 51. The first strip-shaped sub-electrodes 711 and the pixel electrode 41 in the sub-pixel unit can form an FFS mode electric field, which can drive the liquid crystal display device to work.

The common electrode 71 may also include second strip-shaped sub-electrodes 712. The extending direction of the second strip-shaped sub-electrodes 712 is consistent with the extending direction of the data lines 51. The orthographic projection of the data lines 51 on the base substrate 10 is within the orthographic projection of the second strip-shaped sub-electrodes 712 on the base substrate 10. Therefore, the second strip-shaped sub-electrodes 712 can form a shielding effect on the data lines 51, and prevent the data line 51 and other electrodes from generating an electric field to cause liquid crystal deflection and light leakage.

As shown in FIG. 2a and FIG. 2b, the common electrode may further include a connecting portion 713, which may extend along the first direction D1, and the connecting portion may be connected to the ends of the first strip-shaped sub-electrodes and the ends of the second strip-shaped sub-electrodes, thereby each of the first strip-shaped electrodes and each of the second strip-shaped electrodes may be connected to each other through the connection portion 713.

The technical solution of the embodiments of the present disclosure will be described in detail below through the preparation process of the array substrate in an embodiment of the present disclosure. It can be understood that, for the term "patterning" mentioned herein, when the patterned material is inorganic material or metal, "patterning" includes coating photoresist, mask exposure, development, etching, stripping photoresist and other processes, and when the patterned material is organic material, "patterning" includes mask exposure, development and other processes. The process of evaporation, deposition, and coating mentioned herein are all mature preparation process in related art.

The preparation process of the array substrate may include the following steps.

Figure 6A:
FIG. 6a is a schematic plan view of an array substrate after a gate metal layer is formed according to an embodiment of the disclosure.
Figure 6A:
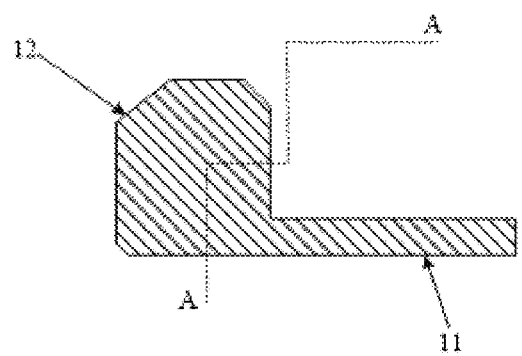
Figure 6B:
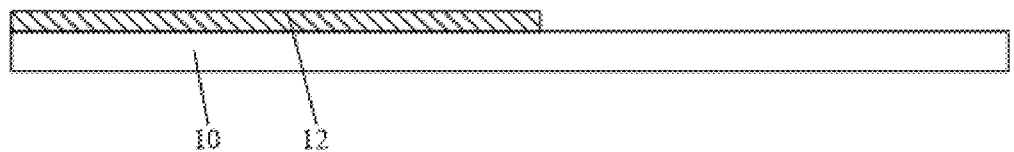

The first patterning process: a gate metal layer is formed on the base substrate 10. The gate metal layer includes a control terminal 12 and a gate line 11, as shown in FIG. 6a and FIG. 6b. FIG. 6a is a schematic plan view of an array substrate after a gate metal layer is formed according to an embodiment of the disclosure. FIG. 6b is a schematic diagram of the A-A cross-sectional structure in FIG. 6a.

Exemplarily, a gate metal film may be deposited on the base substrate 10, and the gate metal film may be patterned to form the control terminal 12 and the gate line 11. The control terminal 12 may be a continuous sheet, and the gate line 11 is connected to the control terminal 12. The gate line 11 may extend in the first direction, and the gate line 11 may be connected to the control terminals 12 in the plurality of sub-pixel units. The material of the gate metal film may include an opaque metal, such as at least one of tantalum (Ta), molybdenum (Mo), tungsten (W), aluminum (Al), and the like.

Figure 7A:
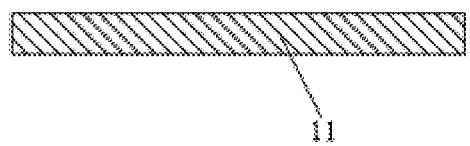
FIG. 7a is a schematic plan view of an array substrate after an active layer is formed according to an embodiment of the disclosure.
Figure 7A:
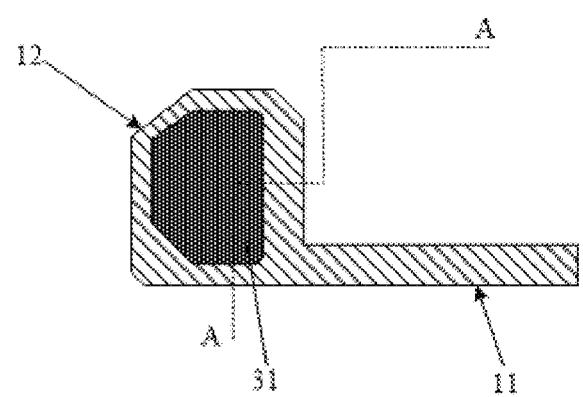
Figure 7B:
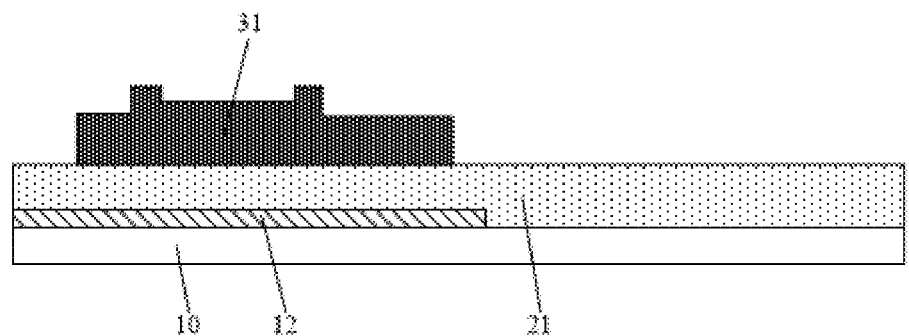

The second patterning process: forming a first insulating layer 21 on a side of the gate metal layer away from the base substrate 10, forming an active film on a side of the first insulating layer 21 away from the base substrate 10, and patterning the active film to form the active layer 31, as shown in FIG. 7a and FIG. 7b. FIG. 7a is a schematic plan view of an array substrate after an active layer is formed according to an embodiment of the disclosure. FIG. 7b is a schematic diagram of the A-A cross-sectional structure in FIG. 7a. The material of the active layer can be a semiconductor material.

Figure 8A:
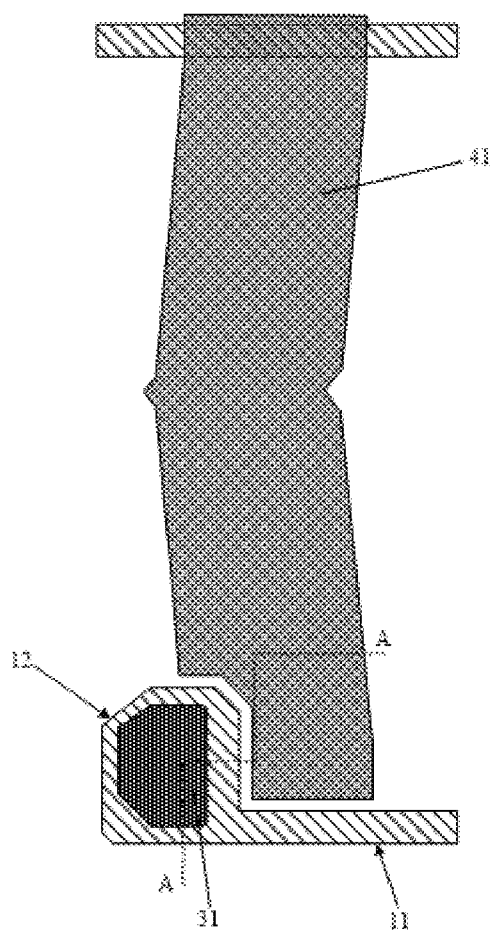
FIG. 8a is a schematic plan view of an array substrate after pixel electrodes is formed according to an embodiment of the disclosure.
Figure 8B:
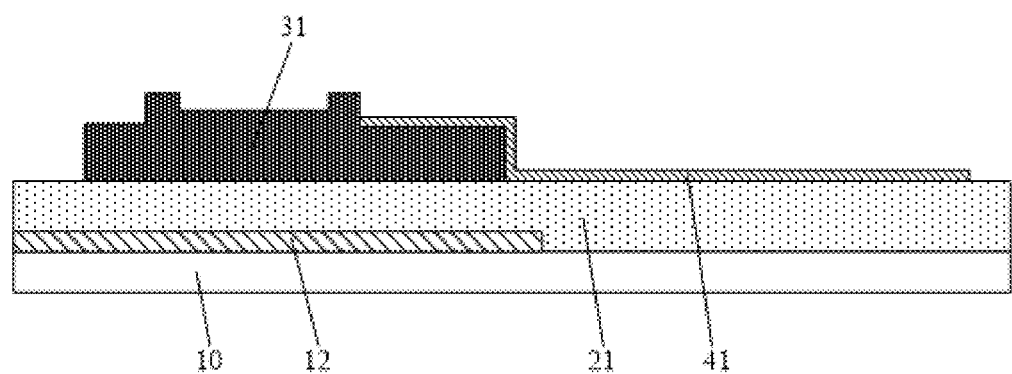

The third patterning process: forming a pixel electrode 41 on a side of the active layer 31 away from the base substrate 10, as shown in FIG. 8a and FIG. 8b. FIG. 8a is a schematic plan view of an array substrate after pixel electrodes is formed according to an embodiment of the disclosure. FIG. 8b is a schematic diagram of the A-A cross-sectional structure in FIG. 8a.

Exemplarily, a transparent electrode film may be deposited on a side of the active layer 31 away from the base substrate 10, and the transparent electrode film may be patterned to form the pixel electrode 41 in the sub-pixel unit, and the pixel electrode 41 has a sheet structure. The material of the pixel electrode may include at least one of indium tin oxide (ITO) and indium zinc oxide (IZO).

Figure 9A:
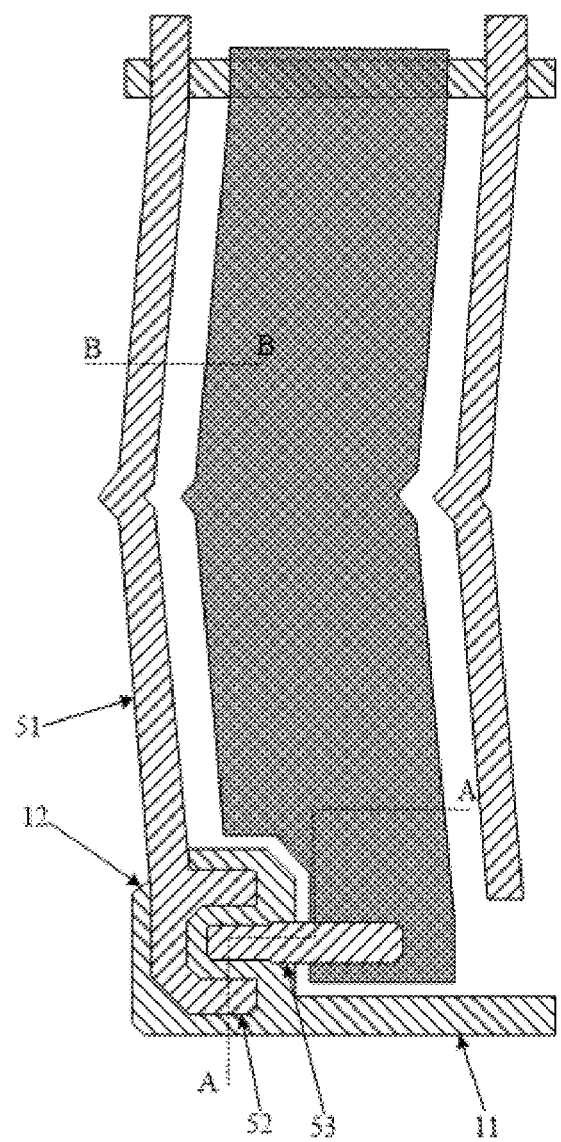
FIG. 9a is a schematic plan view of an array substrate after a source and drain metal layer is formed according to an embodiment of the disclosure.
Figure 9B:
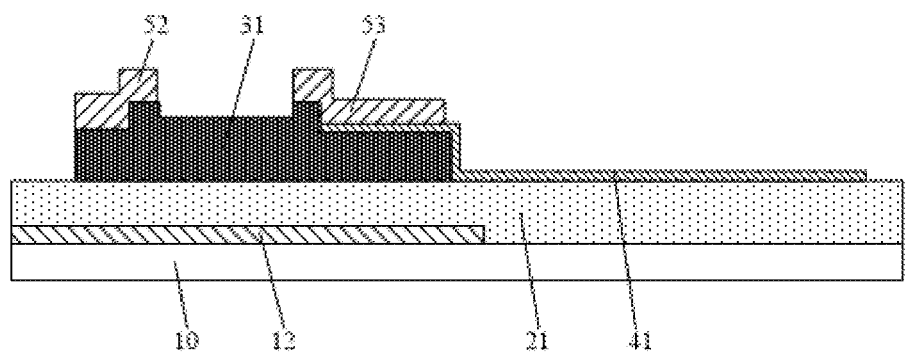

The fourth patterning process: forming a source-drain metal layer on a side of the pixel electrode 41 away from the base substrate 10. The source-drain metal layer includes a first electrode 52, a second electrode 53, and a data line 51, as shown in FIG. 9a and FIG. 9b. FIG. 9a is a schematic plan view of an array substrate after a source and drain metal layer is formed according to an embodiment of the disclosure. FIG. 9b is a schematic diagram of the A-A cross-sectional structure in FIG. 9a. The active layer is not shown in FIG. 9a for clarity.

Exemplarily, a source-drain metal film is deposited on the side of the pixel electrode 41 away from the base substrate 10, and the source-drain metal film is patterned to form a first electrode 52, a second electrode 53 and a data line 51, and the data line 51 extend along the second direction. The data line 51 is connected to the first electrode 52, and the second electrode 53 is connected to the pixel electrode 41. The orthographic projection of the second electrode 52 on the base substrate 10 is within the orthographic projection of the control terminal 12 on the base substrate 10. The first electrode 52 may have a "U"-shaped groove shape, and the second electrode 53 is inserted into the groove of the first electrode 52. It can be understood that the specific shape of the first electrode 52 can be set according to actual needs, and is not limited to the shape in FIG. 9a. The material of the source-drain metal film may include opaque metals, such as at least one of tantalum (Ta), molybdenum (Mo), tungsten (W), aluminum (Al), and the like.

The fifth patterning process: forming a second insulating layer 61 on a side of the second electrode 53 away from the base substrate 10, and forming a common electrode 71 on a side of the second insulating layer 61 away from the base substrate 10, as shown in FIG. 2a and FIG. 3.

It can be known from the preparation process of the array substrate that the array substrate of the embodiment of the present disclosure does not increase the number of masks and the process steps.

Based on the inventive concept of the foregoing embodiments, an embodiment of the present disclosure further provides a display device, which includes a first substrate and a second substrate disposed oppositely, and a liquid crystal layer between the first substrate and the second substrate. The first substrate adopts the array substrate in any embodiment of the present disclosure, and the common electrode faces the liquid crystal layer. The display device can be any product or component with a display function, such as a mobile phone, a tablet computer, a television, a monitor, a notebook computer, a digital photo frame, a navigator, and so on.

The display device in the embodiments of the present disclosure can eliminate the light leakage in the dark state of the display device, reduce the light leakage phenomenon in the thin film transistor area. Even if there is an alignment deviation of the black matrix, it can also block the light leakage at an oblique viewing angle, and improve the contrast and process stability of the product.

Through experimental simulations, for the display device of an embodiment of the present disclosure, in the dark state, each sub-pixel unit has no light leakage, the brightness is reduced in the dark state, and the contrast is increased from 900:1 in the prior art to 1000:1, and the contrast is greatly improved.

In the description of this specification, it should be understood that the orientations or positional relations indicated by the terms such as "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like are based on the orientations or positional relations shown in the drawings, which are only for the convenience of describing the present disclosure and simplifying the description, and do not indicate or imply an indicated device or element must have a specific orientation, or be constructed and operated in a specific orientation, and therefore cannot be construed as a limitation to the present disclosure.

In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present disclosure, "plurality" means two or more, unless specifically defined otherwise.

In the present disclosure, unless expressly specified and defined otherwise, the terms such as "installation", "connected", "connection", "fixation", etc. should be understood broadly, for example, they can be fixed connection, detachable connection or integral connection; they can be mechanical connection, electrical connection or communication; they can be direct connection or indirect connection via an intermediate medium, or communication between two elements or interaction between two elements. Those ordinarily skilled in the art may understand the specific meanings of the above terms in the present disclosure based on specific situations.

In the present disclosure, unless expressly specified and defined otherwise, the first feature being "on" or "under" the second feature may include the first feature being in direct contact with the second feature, and may also include the first feature and the second feature being not in direct contact but in contact with each other via another feature therebetween. Moreover, the first feature being "on", "above" and "over" the second feature includes the first feature being directly above and diagonally above the second feature, or it simply means that the level height of the first feature is larger than that of the second feature. The first feature being "under", "below" and "beneath" the second feature includes the first feature being directly below and diagonally below the second feature, or it simply means that the level height of the first feature is smaller than that of the second feature.

The above disclosure provides many different embodiments or examples for implementing different structures of the present disclosure. In order to simplify the present disclosure, components and settings of specific examples are described above. Of course, they are only examples, and are not intended to limit the present disclosure. In addition, the present disclosure may repeat reference numerals and/or reference letters in different examples, and this repetition is for the purpose of simplification and clarity and does not itself indicate the relationships between the various embodiments and/or settings discussed.

What have been described are only specific embodiments of the present disclosure, but the protection scope of the present disclosure is not so limited. Any variations or substitutions that can be easily conceived by a skilled person familiar with this technical field shall be encompassed within the protection scope of the present disclosure. Thus, the protection scope of the present disclosure shall be based on that of the claims.

What is claimed is:

1. An array substrate, comprising:
a plurality of sub-pixel units arranged in an array, each sub-pixel unit of the plurality of sub-pixel units comprising a base substrate, a thin film transistor, a pixel electrode and a common electrode, the common electrode being on a side of the base substrate, the thin film transistor and the pixel electrode being between the base substrate and the common electrode, the thin film transistor comprising a control terminal, a first electrode and a second electrode, the pixel electrode being connected to the second electrode, and the control terminal being in a continuous sheet shape, an orthographic projection of a boundary of the control terminal on the base substrate being within an orthographic projection of the common electrode on the base substrate,
wherein a portion of the common electrode corresponding to the control terminal comprises an opening, an orthographic projection of the control terminal on the base substrate and the orthographic projection of the common electrode on the base substrate have a first overlap area, and the first overlap area surrounds an orthographic projection of the opening on the base substrate.

2. The array substrate according to claim 1, wherein a part of the orthographic projection of the control terminal on the base substrate is in the first overlap area, and a range of a width d of the first overlap area satisfies 0<d≤s/2, s is a width of the control terminal, and measurement directions of d and s are same.

3. The array substrate according to claim 1, wherein the thin film transistor further comprises an active layer, the array substrate further comprises a first insulating layer, the control terminal is on a side of the base substrate, the first insulating layer is on a side of the control terminal away from the base substrate, the active layer is on a side of the first insulating layer away from the base substrate, and the first electrode and the second electrode are on a side of the active layer away from the base substrate, an orthographic projection of the first electrode on the base substrate is within an orthographic projection of the control terminal on the base substrate.

4. The array substrate according to claim 3, wherein the array substrate further comprises a second insulating layer, the second insulating layer is on a side of the second electrode away from the base substrate, the common electrode is on a side of the second insulating layer away from the base substrate, and wherein the pixel electrode is between the active layer and the second electrode.

5. The array substrate according to claim 3, wherein the array substrate further comprises a second insulating layer, the second insulating layer is on a side of the second electrode away from the base substrate, the common electrode is on a side of the second insulating layer away from the base substrate, and wherein the pixel electrode is between the second electrode and the second insulating layer.

6. The array substrate according to claim 1, wherein the thin film transistor further comprises an active layer, the active layer is on a side of the base substrate, the array substrate further comprises a first insulating layer, a second insulating layer and a third insulating layer, the first insulating layer is on a side of the active layer away from the base substrate, the control terminal is on a side of the first insulating layer away from the base substrate, the second insulating layer is on a side of the control terminal away from the base substrate, the third insulating layer is on a side of the second insulating layer away from the base substrate, the first electrode, the second electrode, and the pixel electrode are between the second insulating layer and the third insulating layer, and the common electrode is on a side of the third insulating layer away from the base substrate.

7. The array substrate according to claim 1, wherein an orthographic projection of the first electrode on the base substrate and the orthographic projection of the common electrode on the base substrate have a second overlap area, and the second overlap area partially surrounds the orthographic projection of the opening on the base substrate.

8. The array substrate according to claim 1, wherein the common electrode comprises a plurality of first strip-shaped sub-electrodes arranged at intervals in the sub-pixel unit.

9. The array substrate according to claim 8, wherein the array substrate further comprises a plurality of gate lines and a plurality of data lines, the plurality of gate lines and the plurality of data lines define the plurality of sub-pixel units, and an extending direction of the first strip-shaped sub-electrodes is consistent with an extending direction of the data lines.

10. The array substrate according to claim 9, wherein the common electrode further comprises second strip-shaped sub-electrodes, an extending direction of the second strip-shaped sub-electrodes is consistent with the extending direction of the data lines, and an orthographic projection of the data lines on the base substrate is within an orthographic projection of the second strip-shaped sub-electrodes on the base substrate.

11. The array substrate according to claim 10, wherein the common electrode further comprises a connecting portion, and each of the first strip-shaped sub-electrodes and each of the second strip-shaped sub-electrodes are connected to each other through the connecting portion.

12. A display device, comprising a first substrate and a second substrate disposed oppositely, and a liquid crystal layer between the first substrate and the second substrate, the first substrate adopting the array substrate according to claim 1, and the common electrode facing the liquid crystal layer.

13. The display device according to claim 12, wherein a part of the orthographic projection of the control terminal on the base substrate is in the first overlap area, and a range of a width d of the first overlap area satisfies $0<d<s/2$, s is a width of the control terminal, and measurement directions of d and s are same.

14. The display device according to claim 12, wherein an orthographic projection of the first electrode on the base substrate and the orthographic projection of the common electrode on the base substrate have a second overlap area, and the second overlap area partially surrounds the orthographic projection of the opening on the base substrate.

15. The display device according to claim 12, wherein the thin film transistor further comprises an active layer, the array substrate further comprises a first insulating layer, the control terminal is on a side of the base substrate, the first insulating layer is on a side of the control terminal away from the base substrate, the active layer is on a side of the first insulating layer away from the base substrate, and the first electrode and the second electrode are on a side of the active layer away from the base substrate, an orthographic projection of the first electrode on the base substrate is within an orthographic projection of the control terminal on the base substrate.

16. The display device according to claim 12, wherein the thin film transistor further comprises an active layer, the active layer is on a side of the base substrate, the array substrate further comprises a first insulating layer, a second insulating layer and a third insulating layer, the first insulating layer is on a side of the active layer away from the base substrate, the control terminal is on a side of the first insulating layer away from the base substrate, the second insulating layer is on a side of the control terminal away from the base substrate, the third insulating layer is on a side of the second insulating layer away from the base substrate, the first electrode, the second electrode, and the pixel electrode are between the second insulating layer and the third insulating layer, and the common electrode is on a side of the third insulating layer away from the base substrate.

* * * * *